US011368350B2

(12) United States Patent
Charan Teja Reddy et al.

(10) Patent No.: US 11,368,350 B2
(45) Date of Patent: Jun. 21, 2022

(54) METHOD FOR SIGNAL SYNCHRONIZATION IN OFDM BASED NB-IOT SYSTEM (71) Applicants: Centre of Excellence in Wireless Technology, Chennai (IN); Indian Institute of Technology Madras (IIT Madras), Chennai (IN)

(72) Inventors: Budama Sree Charan Teja Reddy, Chennai (IN); Sunil Kaimalettu, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IITMADRAS), Chennai (IN)

(*) Notice: Subject to any disclaimer, the term of this patent is extended or adjusted under 35 U.S.C. 154(b) by 172 days.

(21) Appl. No.: 16/900,278

(22) Filed: Jun. 12, 2020

(65) Prior Publication Data
US 2020/0396114 A1    Dec. 17, 2020

(30) Foreign Application Priority Data
Jun. 13, 2019   (IN) .............................. 201941023543

(51) Int. Cl.
H04L 27/26    (2006.01)
H04J 11/00    (2006.01)
(Continued)

(52) U.S. Cl.
CPC .......... H04L 27/2675 (2013.01); H04J 11/00 (2013.01); H04W 56/001 (2013.01);
(Continued)

(58) Field of Classification Search
CPC ... H04L 27/2675; H04L 67/12; H04L 27/261; H04L 27/2657; H04L 27/2663;
(Continued)

(56) References Cited

U.S. PATENT DOCUMENTS

2019/0097762 A1* 3/2019 Jeon ...................... H04W 28/04
2021/0076428 A1* 3/2021 Wei ...................... H04W 74/002
2021/0111824 A1* 4/2021 Park ...................... H04J 11/0073

FOREIGN PATENT DOCUMENTS

CN    108123774 A  *  6/2018
EP    3457770 A1  *  3/2019   ............ H04W 76/14

OTHER PUBLICATIONS

3rd Generation Partnership Project; Technical Specification Group Radio Access Network; Evolved Universal Terrestrial Radio Access (E-UTRA); Physical channels and modulation (Release 14) (3GPP TS 36.211 V14.1.0 (Dec. 2016); Sec 10.2.7) (Year: 2016).*

* cited by examiner

Primary Examiner — Shailendra Kumar (57) ABSTRACT

Accordingly, embodiments herein disclose a method for signal synchronization in orthogonal frequency-division multiplexing (OFDM) based Narrow Band-Internet of Thing (NB-IoT) system. The method includes generating a New Radio-Narrowband Primary Synchronization Signal (NR-NPSS). Further, the method includes mapping each Zadoff-chu sequence of 14 Zadoff-chu sequences of the NR-NPSS to resource elements of each OFDM symbol of 14 OFDM symbols in an NR-NPSS subframe. Further, the method includes transmitting the NR-NPSS subframe comprising the mapped NR-NPSS to at least one User Equipment (UE) (200), receiving the NR-NPSS subframe comprising the transmitted NR-NPSS by a base station (100), generating a reference NR-NPSS, mapping each of the 14 Zadoff-chu sequences of the NR-NPSS to resource elements of each
(Continued)

OFDM symbol of 14 OFDM symbols in an NR-NPSS subframe, and detecting the NR-NPSS from the received NR-NPSS subframe using the reference NR-NPSS to obtain the time and frequency synchronization in the NB-IoT system.

63 Claims, 8 Drawing Sheets

(51) Int. Cl.
*H04W 56/00* (2009.01)
*H04L 67/12* (2022.01)
*H04W 84/04* (2009.01)
*H04W 88/08* (2009.01)

(52) U.S. Cl.
CPC ....... *H04J 2011/0009* (2013.01); *H04L 67/12* (2013.01); *H04W 84/042* (2013.01); *H04W 88/08* (2013.01)

(58) Field of Classification Search
CPC ............... H04J 11/00; H04J 2011/0009; H04J 11/0073; H04J 13/0062; H04W 56/001; H04W 84/042; H04W 88/08
See application file for complete search history.

| i | 3 | 4 | 5 | 6 | 7 | 8 | 9 | 10 | 11 | 12 | 13 |
|---|---|---|---|---|---|---|---|---|---|---|---|
| S(i) | 1 | 1 | 1 | 1 | -1 | -1 | 1 | 1 | 1 | -1 | 1 |

Table 1. Definition of $S(i)$

| Combination # | S(0) | S(1) | S(2) | S(3) | S(4) | S(5) | S(6) | S(7) | S(8) | S(9) | S(10) | S(11) | S(12) | S(13) |
|---|---|---|---|---|---|---|---|---|---|---|---|---|---|---|
| 0 | 1 | 1 | 1 | 1 | 1 | 1 | 1 | -1 | -1 | 1 | 1 | 1 | -1 | 1 |
| 1 | 1 | 1 | -1 | 1 | 1 | 1 | 1 | -1 | -1 | 1 | 1 | 1 | -1 | 1 |
| 2 | 1 | -1 | 1 | 1 | 1 | 1 | 1 | -1 | -1 | 1 | 1 | 1 | -1 | 1 |
| 3 | 1 | -1 | -1 | 1 | 1 | 1 | 1 | -1 | -1 | 1 | 1 | 1 | -1 | 1 |
| 4 | -1 | 1 | 1 | 1 | 1 | 1 | 1 | -1 | -1 | 1 | 1 | 1 | -1 | 1 |
| 5 | -1 | 1 | -1 | 1 | 1 | 1 | 1 | -1 | -1 | 1 | 1 | 1 | -1 | 1 |
| 6 | -1 | -1 | 1 | 1 | 1 | 1 | 1 | -1 | -1 | 1 | 1 | 1 | -1 | 1 |
| 7 | -1 | -1 | -1 | 1 | 1 | 1 | 1 | -1 | -1 | 1 | 1 | 1 | -1 | 1 |

Table 2: Definition of $S(i)$

FIG. 8

METHOD FOR SIGNAL SYNCHRONIZATION IN OFDM BASED NB-IOT SYSTEM

FIELD OF INVENTION

The present disclosure relates to a wireless communication, and more specifically relates to a method for signal synchronization in orthogonal frequency-division multiplexing (OFDM) based Narrow Band-Internet of Thing (NB-IoT) system. The present application is based on, and claims priority from Indian Application Number 201941023543 dated Jun. 12, 2019 the disclosure of which is hereby incorporated by reference herein.

BACKGROUND OF INVENTION

Narrowband internet of things (NB-IoT) is a cellular based internet of things developed by 3 gpp ($3^{rd}$ generation private partnership). The NB-IoT addresses key requirements of IoT, viz., ultra-low device complexity, ultra-low device cost, long battery life, supporting a maximum coupling loss of 164 dB, and supporting a very large number of devices. Bandwidth of the NB-IoT is 180 kiloHertz (kHz), which is equivalent to one physical resource block (PRB) in 3 gpp LTE (Long term evolution). The NB-IoT is commercially successful and is already deployed in several countries.

Figure 1:
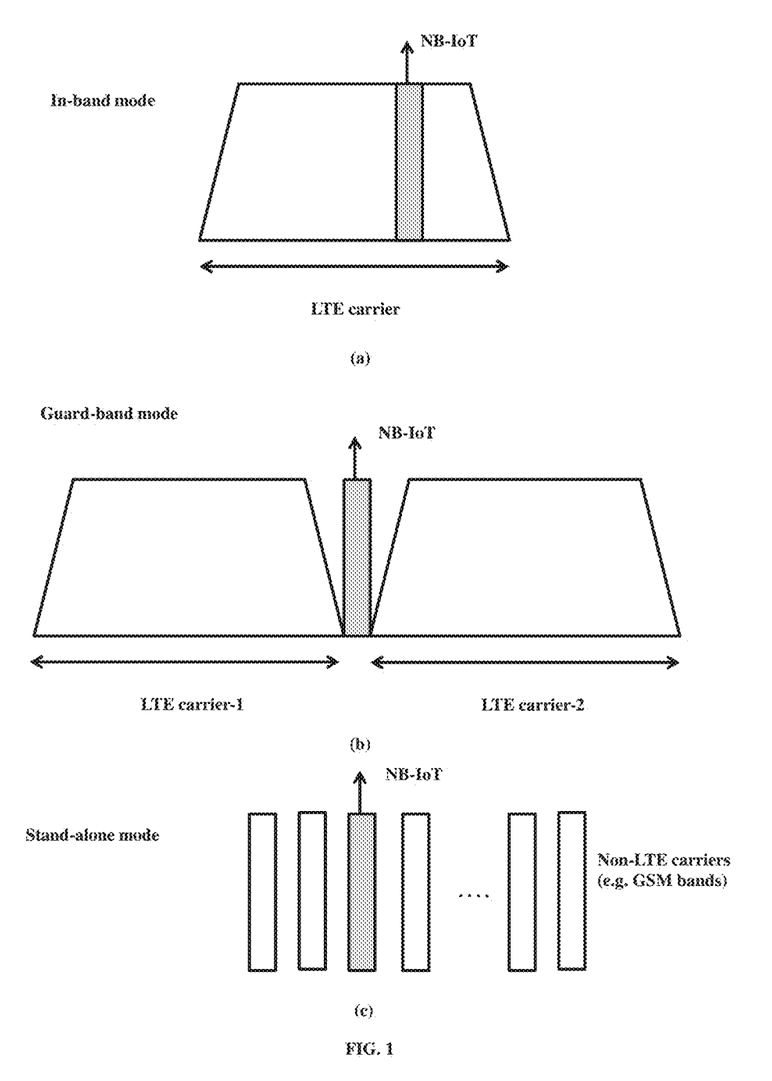
FIG. 1 illustrates a types of deployment modes supported by Narrow Band-Internet of Thing (NB-IoT), according to a prior art disclosed herein.

The NB-IoT supports three types of deployment modes, they are an In-band mode, a Guard-band mode, and a Stand-alone mode (refer FIG. 1). In the In-band mode (notation "a"), the 180 kHz bandwidth for the NB-IoT is allotted by reserving one PRB inside the LTE band. In the Guard-band mode (notation "b"), the NB-IoT uses the unused guard-band resources between two LTE carriers. In the Stand-alone mode (notation "c"), the NB-IoT uses the stand-alone 200 KHz carrier, e.g., Global System for Mobile communication (GSM) bands by re-farming them.

As the NB-IoT bandwidth is smaller, NB-IoT systems require a new design for synchronization signals which are different than LTE synchronization signals. The 3 gpp developed a common framework for the synchronization signals for all NB-IoT deployment modes. Similar to the LTE, NB-IoT synchronization signals comprise a narrowband primary synchronization signal (NPSS) and narrowband secondary synchronization signal (NSSS). NPSS helps in detecting the synchronization signal, time and frequency synchronization, etc. Physical cell ID (PCID) and duplexing scheme is conveyed by NSSS.

Figure 2:
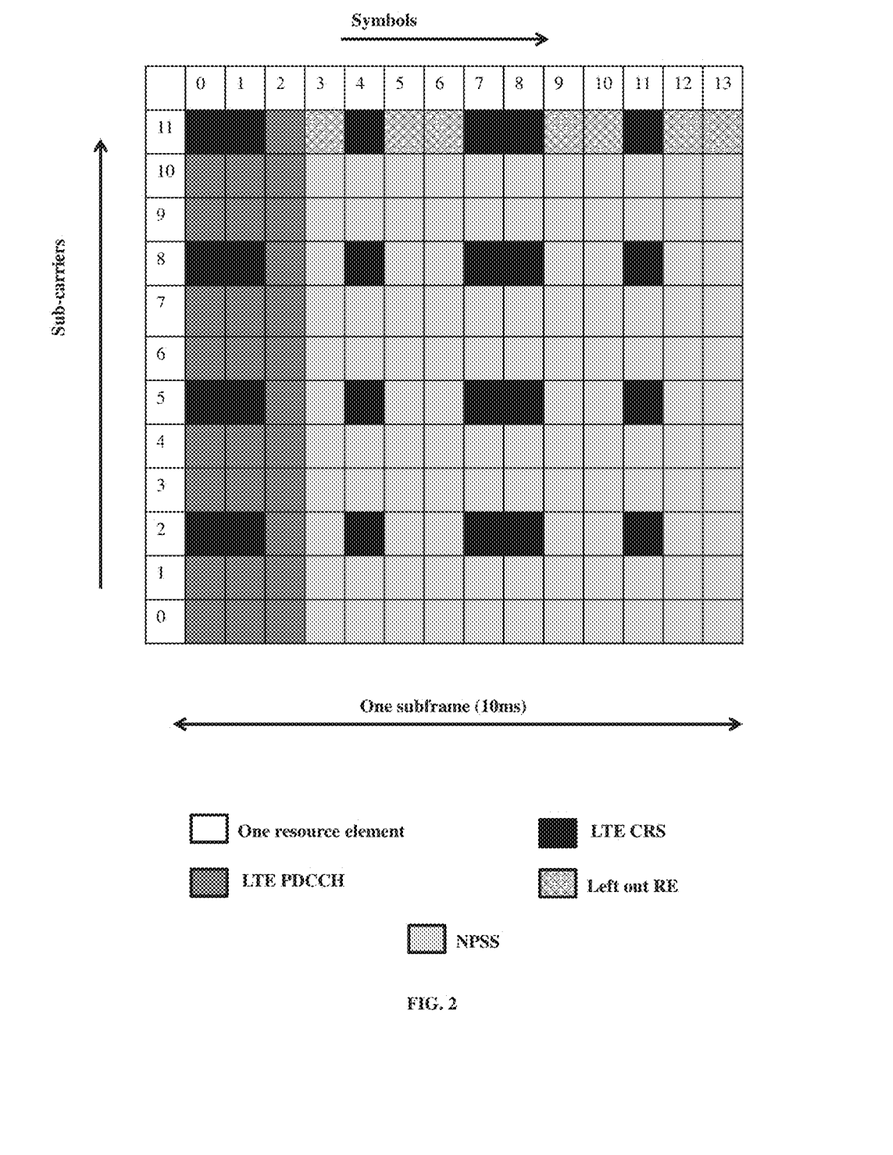
FIG. 2 illustrates a resource element (RE) mapping of narrowband primary synchronization signal (NPSS), according to a prior art disclosed herein.

In existing NPSS (refer FIG. 2), the NPSS is a collection of 11 Zadoff-Chu based short sequences of length 11. The NPSS occupies a subframe of 14 symbols. Out of the 14 symbols in the NPSS subframe, the first 3 symbols are excluded to avoid collision with LTE PDCCH. The 11 Zadoff-Chu sequences are mapped to the remaining 11 symbols. In each symbol, one resource element (RE) is left out as the length of the sequence is 11. Also, in the case of In-band deployment mode, cell-specific reference signal (CRS) locations are punctured in these 11 symbols to avoid interference to LTE.

Figure 8:
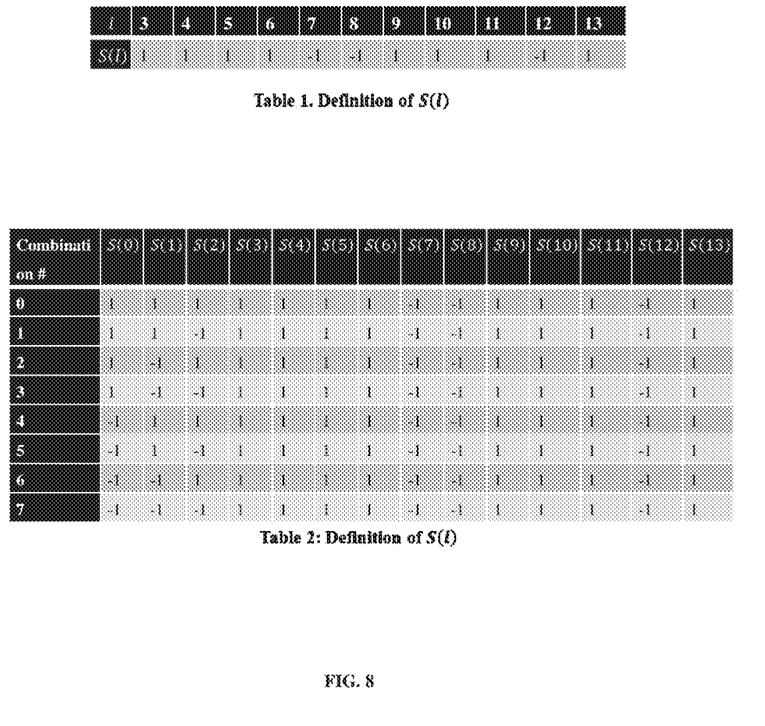
FIG. 8 illustrates a table-1 and table-2 for definition of S (l), according to an embodiment as disclosed herein.

For NPSS sequence generation, According to the NB-IoT specifications, the NPSS sequence $d_l(n)$ is generated using the following equation.

$$d_l(n) = S(l) \cdot e^{-j\frac{\pi u n(n+1)}{11}} \quad (1)$$

Where the Zadoff-chu sequence root index u=5, n=0, 1, 2, ..., 10 and S(l) for different symbol indices l=3, 4, ..., 13 is given by the following Table 1 illustrated in FIG. 8.

Coexistence of the NB-IoT with a new radio (NR): The three main candidates of 5G ($5^{th}$ generation) are enhanced mobile broadband (eMBB), ultra-reliable, and low latency communications (URLLC), and massive machine-type communications (mMTC). 3 gpp has already been developing specifications for the NR air interface from Release 15 as a 5G standard. 3 gpp has been developing NB-IoT from Release-13/14 to address the requirements of low power wide area networks (LPWAN). NB-IoT is expected to meet most of the requirements of mMTC set by International Telecommunication Union (ITU). The NB-IoT is developed to coexist only with LTE. Now, 3 gpp is studying the NR and current NB-IoT specifications to identify possible issues in making NB-IoT coexist with the NR. The NR followed 'self-contained' design to avoid 'always ON' signals. Unlike LTE, PDCCH will not occupy the total bandwidth and reference signals are transmitted only on a need basis. The NR also supports resource reservations in both time and frequency domains for future compatibility. These NR features will make the NB-IoT coexistence smoother.

In the current NB-IoT specifications, NPSS subframe avoids the first three symbols to avoid collision with LTE PDCCH. This restriction brings inefficiency in resource utilization if design is adopted as it is, in case of coexistence with the NR. So, a new NPSS design called as NR-NPSS is proposed for NB-IoT. NR-NPSS makes use of the resources effectively and improves the detection performance compared to the existing design.

Thus, it is desired to address the above-mentioned disadvantages or other shortcomings or at least provide a useful alternative.

OBJECT OF INVENTION

The principal object of the embodiments herein is to provide a method for signal synchronization in orthogonal frequency-division multiplexing (OFDM) based Narrow Band-Internet of Thing (NB-IoT) system.

Another object of the embodiment herein is to generate a New Radio-Narrowband Primary Synchronization Signal (NR-NPSS) based on determining a binary sequence, a root index, a circular shift, and a symbol index for each of a Zadoff-chu sequence of 14 Zadoff-chu sequences.

Another object of the embodiment herein is to map each Zadoff-chu sequence of the 14 Zadoff-chu sequences of the NR-NPSS to resource elements of each OFDM symbol of 14 OFDM symbols in an NR-NPSS subframe.

Another object of the embodiment herein is to transmit the NR-NPSS subframe comprising the mapped NR-NPSS to at least one User Equipment (UE).

Another object of the embodiment herein is to receive the NR-NPSS subframe comprising the transmitted NR-NPSS by a base station.

Another object of the embodiment herein is to generate a reference NR-NPSS, the reference NR-NPSS comprises 14 Zadoff-Chu sequences each of which is of length 11, all the 14 Zadoff-Chu sequences are used to obtain time and frequency synchronization in the NB-IoT system.

Another object of the embodiment herein is to map each of the 14 Zadoff-chu sequences of the reference NR-NPSS to resource elements of each OFDM symbol of 14 OFDM symbols in an NR-NPSS subframe.

Another object of the embodiment herein is to detect the NR-NPSS from the received NR-NPSS subframe using the reference NR-NPSS to obtain the time and frequency synchronization in the NB-IoT system.

BRIEF SUMMARY OF THE INVENTION

Accordingly, embodiments herein disclose a method for signal synchronization in orthogonal frequency-division multiplexing (OFDM) based Narrow Band-Internet of Thing (NB-IoT) system. The method includes generating, by a base station, a New Radio-Narrowband Primary Synchronization Signal (NR-NPSS), wherein the NR-NPSS comprises 14 Zadoff-Chu sequences each of which is of length 11, wherein all the 14 Zadoff-Chu sequences are used to obtain time and frequency synchronization in the NB-IoT system. Further, the method includes mapping, by the base station, each Zadoff-chu sequence of the 14 Zadoff-chu sequences of the NR-NPSS to resource elements of each OFDM symbol of 14 OFDM symbols in an NR-NPSS subframe. Further, the method includes transmitting, by the base station, the NR-NPSS subframe comprising the mapped NR-NPSS to at least one User Equipment (UE).

In an embodiment, each Zadoff-chu sequence of the 14 Zadoff-chu sequences are obtained by at least one of changing a root index and cyclically shifting the Zadoff-chu sequences obtained with a specific root index.

In an embodiment, generating, by the base station, the NR-NPSS includes determining a binary sequence for the 14 Zadoff-Chu sequences, determining a root index for each Zadoff-chu sequence of the 14 Zadoff-chu sequences, determining a circular shift for each Zadoff-chu sequence of the 14 Zadoff-chu sequences, determining a symbol index for each Zadoff-chu sequence of the 14 Zadoff-chu sequences, generating the NR-NPSS based on the binary sequence, the root index, the circular shift, and the symbol index.

In an embodiment, the root index is one of same and different for each Zadoff-chu sequence of the 14 Zadoff-chu sequences.

In an embodiment, the root index is 5 for all the 14 Zadoff-chu sequences.

In an embodiment, the circular shift is one of same and different for each Zadoff-chu sequence of the 14 Zadoff-chu sequences.

In an embodiment, the circular shift lies in a range of 0 to 11.

In an embodiment, a positive or negative sign of each Zadoff-chu sequence of the 14 Zadoff-Chu sequences depends on the binary sequence.

In an embodiment, the binary sequence depends on code cover ID (B) lying in a range of 0 to 16384.

In an embodiment, the root index is one of same and different for Zadoff-chu sequences 0 to 3 of the 14 Zadoff-Chu sequences.

In an embodiment, the root index is 5 for Zadoff-chu sequences 4 to 11 of the 14 Zadoff-Chu sequences.

In an embodiment, the circular shift is one of same and different for Zadoff-chu sequences 0 to 3 of the 14 Zadoff-Chu sequences.

In an embodiment, the circular shift lies in a range of 0 to 11 for Zadoff-chu sequences 0 to 3 of the 14 Zadoff-Chu sequences.

In an embodiment, the circular shift is 0 for Zadoff-chu sequences 4 to 11 of the 14 Zadoff-Chu sequences.

In an embodiment, the binary sequence is one of code cover sequence(S) of 8 code cover sequences.

In an embodiment, mapping each Zadoff-chu sequence of the 14 Zadoff-Chu sequences to the resource elements of each OFDM symbol of the 14 OFDM symbols in the NR-NPSS subframe comprising mapping 11 elements in each Zadoff-chu sequence of the 14 Zadoff-chu sequence to any of the 11 resource elements in each OFDM symbol of the 14 OFDM symbols in the NR-NPSS subframe.

In an embodiment, the 11 resource elements in each OFDM symbol of the 14 OFDM symbols in the NR-NPSS subframe is one of resource element index 0 to 10 leaving resource element index 11 in each of the OFDM symbols, and resource element index 1 to 11 leaving resource element index 0 in each of the OFDM symbols.

In an embodiment, the method includes receiving, by the at least one UE, the NR-NPSS subframe comprising the transmitted NR-NPSS by the base station. Further, the method includes generating, by the UE, a reference NR-NPSS, wherein the reference NR-NPSS comprises 14 Zadoff-Chu sequences each of which is of length 11, wherein all the 14 Zadoff-Chu sequences are used to obtain time and frequency synchronization in the NB-IoT system. Further, the method includes mapping, by the UE, each of the 14 Zadoff-chu sequences of the reference NR-NPSS to resource elements of each OFDM symbol of 14 OFDM symbols in an NR-NPSS subframe. Further, the method includes detecting by the UE, the NR-NPSS from the received NR-NPSS subframe using the reference NR-NPSS to obtain the time and frequency synchronization in the NB-IoT system.

Accordingly, the embodiments herein provide the base station for signal synchronization OFDM based NB-IoT system. The base station includes a memory, a processor, and a NR-NPSS circuit, coupled with the processor and the memory. The NR-NPSS circuit is configured to generate the NR-NPSS, the NR-NPSS comprises 14 Zadoff-Chu sequences each of which is of length 11, all the 14 Zadoff-Chu sequences are used to obtain time and frequency synchronization in the NB-IoT system. Further, the NR-NPSS circuit is configured to map each Zadoff-chu sequence of the 14 Zadoff-chu sequences of the NR-NPSS to resource elements of each OFDM symbol of 14 OFDM symbols in an NR-NPSS subframe. Further, the NR-NPSS circuit is configured to transmit the NR-NPSS subframe comprising the mapped NR-NPSS to at least one UE.

Accordingly, the embodiments herein provide the UE for signal synchronization in a through the NB-IoT system. The UE includes a memory, a processor, and a NR-NPSS circuit, coupled with the processor and the memory. The NR-NPSS circuit is configured to receive the NR-NPSS subframe comprising the transmitted NR-NPSS by the base station. Further, the NR-NPSS circuit is configured to generate a reference NR-NPSS, wherein the reference NR-NPSS comprises 14 Zadoff-Chu sequences each of which is of length 11, wherein all the 14 Zadoff-Chu sequences are used to obtain time and frequency synchronization in the NB-IoT system. Further, the NR-NPSS circuit is configured to map each of the 14 Zadoff-chu sequences of the reference NR-NPSS to resource elements of each OFDM symbol of 14 OFDM symbols in an NR-NPSS subframe. Further, the NR-NPSS circuit is configured to detect the NR-NPSS from the received NR-NPSS subframe using the reference NR-NPSS to obtain the time and frequency synchronization in the NB-IoT system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for signal synchronization in orthogonal frequency-division multiplexing (OFDM) based Narrow Band-Internet of Thing (NB-IoT) system. The method includes generating, by a base station, a New Radio-Narrowband Primary Synchronization Signal (NR-NPSS), wherein the NR-NPSS comprises 14 Zadoff-Chu sequences each of which is of length 11, wherein all the 14 Zadoff-Chu sequences are used to obtain time and frequency synchronization in the NB-IoT system. Further, the method includes mapping, by the base station, each Zadoff-chu sequence of the 14 Zadoff-chu sequences of the NR-NPSS to resource elements of each OFDM symbol of 14 OFDM symbols in an NR-NPSS subframe. Further, the method includes transmitting, by the base station, the NR-NPSS subframe comprising the mapped NR-NPSS to at least one User Equipment (UE).

Referring now to the drawings, and more particularly to FIGS. 3 through 8, there are shown preferred embodiments.

Figure 3:
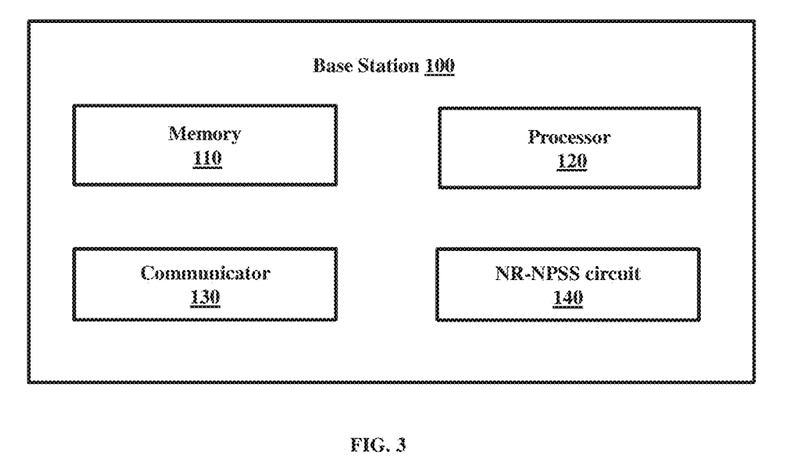
FIG. 3 illustrates a block diagram of a base station for signal synchronization in orthogonal frequency-division multiplexing (OFDM) based NB-IoT system, according to an embodiment as disclosed herein.

FIG. 3 illustrates a block diagram of a base station (100) for signal synchronization in OFDM based NB-IoT system, according to an embodiment as disclosed herein. In an embodiment, the base station (100) includes a memory (110), a processor (120), a communicator (130), and an NR-NPSS circuit (140).

The memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). In an embodiment, the memory (110) can be an internal storage unit or it can be an external storage unit of the base station (100), a cloud storage, or any other type of external storage.

The processor (120) communicates with the memory (110), the communicator (130), and the NR-NPSS circuit (140). The processor (120) is configured to execute instructions stored in the memory (110) and to perform various processes. The communicator (130) is configured for communicating internally between internal hardware components and with external devices via one or more networks.

In an embodiment, the NR-NPSS circuit (140) generates a NR-NPSS, the NR-NPSS comprises 14 Zadoff-Chu sequences each of which is of length 11, all the 14 Zadoff-Chu sequences are used to obtain time and frequency synchronization in the NB-IoT system. Further, the NR-NPSS circuit (140) maps each Zadoff-chu sequence of the 14 Zadoff-chu sequences of the NR-NPSS to resource elements of each OFDM symbol of 14 OFDM symbols in an NR-NPSS subframe. Further, the NR-NPSS circuit (140) transmits the NR-NPSS subframe comprising the mapped NR-NPSS to at least one UE (200).

In an embodiment, each Zadoff-chu sequence of the 14 Zadoff-chu sequences are obtained by at least one of changing a root index and cyclically shifting the Zadoff-chu sequences obtained with a specific root index.

In an embodiment, the NR-NPSS circuit (140) determines a binary sequence for the 14 Zadoff-Chu sequences, a root index for each Zadoff-chu sequence of the 14 Zadoff-chu sequences, a circular shift for each Zadoff-chu sequence of the 14 Zadoff-chu sequences, a symbol index for each Zadoff-chu sequence of the 14 Zadoff-chu sequences, and generates the NR-NPSS based on the binary sequence, the root index, the circular shift, and the symbol index. The root index is one of same and different for each Zadoff-chu sequence of the 14 Zadoff-chu sequences. The root index is 5 for all the 14 Zadoff-chu sequences. The circular shift is one of same and different for each Zadoff-chu sequence of the 14 Zadoff-chu sequences. The circular shift lies in a range of 0 to 11. A positive or negative sign of each Zadoff-chu sequence of the 14 Zadoff-Chu sequences depends on the binary sequence. The binary sequence depends on code cover ID (B) lying in a range of 0 to 16384.

In an embodiment, the root index is one of same and different for Zadoff-chu sequences 0 to 3 of the 14 Zadoff-Chu sequences. The root index is 5 for Zadoff-chu sequences 4 to 11 of the 14 Zadoff-Chu sequences. The circular shift is one of same and different for Zadoff-chu sequences 0 to 3 of the 14 Zadoff-Chu sequences. The circular shift lies in a range of 0 to 11 for Zadoff-chu sequences 0 to 3 of the 14 Zadoff-Chu sequences. The circular shift is 0 for Zadoff-chu sequences 4 to 11 of the 14 Zadoff-Chu sequences. The binary sequence is one of code cover sequence (S) of 8 code cover sequences.

In an embodiment, mapping each Zadoff-chu sequence of the 14 Zadoff-Chu sequences to the resource elements of each OFDM symbol of the 14 OFDM symbols in the NR-NPSS subframe comprising mapping 11 elements in each Zadoff-chu sequence of the 14 Zadoff-chu sequence to any of the 11 resource elements in each OFDM symbol of the 14 OFDM symbols in the NR-NPSS subframe.

In an embodiment, 11 resource elements in each OFDM symbol of the 14 OFDM symbols in the NR-NPSS subframe is one of resource element index 0 to 10 leaving resource element index 11 in each of the OFDM symbol, and resource element index 1 to 11 leaving resource element index 0 in each of the OFDM symbol.

Although the FIG. 3 shows various hardware components of the base station (100) but it is to be understood that other embodiments are not limited thereon. In other embodiments, the base station (100) may include less or more number of components. Further, the labels or names of the components are used only for illustrative purpose and does not limit the scope of the invention. One or more components can be combined together to perform same or substantially similar function to signal synchronization in OFDM based NB-IoT system.

Figure 4:
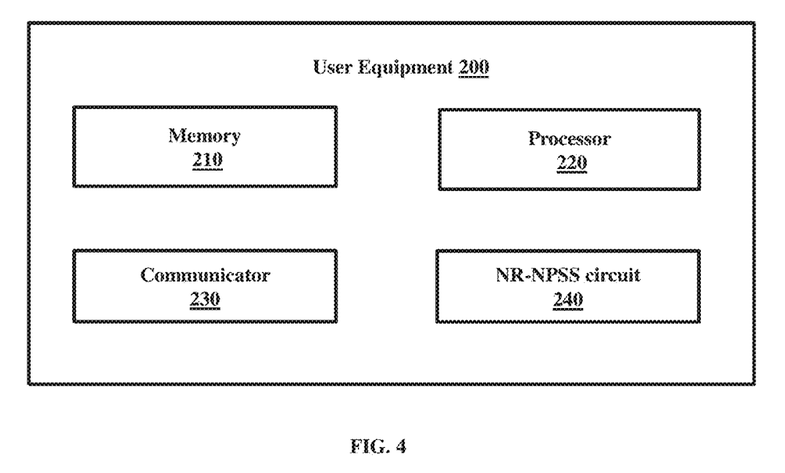
FIG. 4 illustrates a block diagram of a User Equipment (UE) for signal synchronization in OFDM based NB-IoT system, according to an embodiment as disclosed herein.

FIG. 4 illustrates a block diagram of the UE (200) for signal synchronization in OFDM based NB-IoT system, according to an embodiment as disclosed herein. In an embodiment, the UE (200) includes a memory (210), a processor (220), a communicator (230), and an NR-NPSS circuit (240).

The memory (210) also stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). In an embodiment, the memory (210) can be an internal storage unit or it can be an external storage unit of the UE (200), a cloud storage, or any other type of external storage.

The processor (220) communicates with the memory (210), the communicator (230), and the NR-NPSS circuit (240). The processor (220) is configured to execute instructions stored in the memory (210) and to perform various processes. The communicator (230) is configured for communicating internally between internal hardware components and with external devices via one or more networks.

In an embodiment, the NR-NPSS circuit (240) receives a NR-NPSS subframe comprising a NR-NPSS transmitted by the base station (100), the NR-NPSS comprises a plurality of Zadoff-Chu sequences of length 11, wherein all the 14 Zadoff-Chu sequences are used to obtain time and frequency synchronization in the NB-IoT system. Further, the NR-NPSS circuit (240) generates a reference NR-NPSS, wherein the reference NR-NPSS comprises 14 Zadoff-Chu sequences each of which is of length 11, wherein all the 14 Zadoff-Chu sequences are used to obtain time and frequency synchronization in the NB-IoT system. Further, the NR-NPSS circuit (240) maps each of the 14 Zadoff-chu sequences of the reference NR-NPSS to resource elements of each OFDM symbol of 14 OFDM symbols in an NR-NPSS subframe. Further, the NR-NPSS circuit (240) detects the NR-NPSS from the received NR-NPSS subframe using the reference NR-NPSS to obtain the time and frequency synchronization in the NB-IoT system.

In an embodiment, the NR-NPSS circuit (240) determines a binary sequence for the 14 Zadoff-Chu sequences, a root index for each Zadoff-chu sequence of the 14 Zadoff-chu sequences, a circular shift for each Zadoff-chu sequence of the 14 Zadoff-chu sequences, a symbol index for each Zadoff-chu sequence of the 14 Zadoff-chu sequences, and generates the NR-NPSS based on the binary sequence, the root index, the circular shift, and the symbol index.

In an embodiment, the root index is one of same and different for each Zadoff-chu sequence of the 14 Zadoff-chu sequences. The root index is 5 for all the Zadoff-chu sequences. The circular shift is one of same and different for each of the Zadoff-chu sequence of the 14 Zadoff-chu sequences. The circular shift lies in a range of 0 to 11. A positive or negative sign of each of the Zadoff-Chu sequence of the 14 Zadoff-Chu sequences depends on the binary sequence. The binary sequence depends on code cover ID (B) lying in a range of 0 to 16384.

In an embodiment, the root index is one of same and different for Zadoff-chu sequences 0 to 3 of the 14 Zadoff-Chu sequences. The root index is 5 for Zadoff-chu sequences 4 to 11 of the 14 Zadoff-Chu sequences. The circular shift is one of same and different for Zadoff-chu sequences 0 to 3 of the 14 Zadoff-Chu sequences. The circular shift lies in a range of 0 to 11 for Zadoff-chu sequences 0 to 3 of the 14 Zadoff-Chu sequences. The circular shift is 0 for Zadoff-chu sequences 4 to 11 of the 14 Zadoff-Chu sequences. The binary sequence is one of code cover sequence (S) of 8 code cover sequences.

In an embodiment, mapping each of the Zadoff-Chu sequence of the 14 Zadoff-Chu sequences to the resource elements of each OFDM symbol of the 14 OFDM symbols in the NR-NPSS subframe comprising mapping 11 elements in each of the Zadoff-chu sequence of the 14 Zadoff-chu sequences to any of the 11 resource elements in each OFDM symbol of the 14 OFDM symbols in the NR-NPSS subframe. The 11 resource elements in each OFDM symbol of the 14 OFDM symbols in the NR-NPSS subframe is one of resource element index 0 to 10 leaving resource element index 11 in each of the OFDM symbol, and resource element index 1 to 11 leaving resource element index 0 in each of the OFDM symbol.

Although the FIG. 4 shows various hardware components of the UE (200) but it is to be understood that other embodiments are not limited thereon. In other embodiments, the UE (200) may include less or more number of components. Further, the labels or names of the components are used only for illustrative purpose and does not limit the scope of the invention. One or more components can be combined together to perform same or substantially similar function to signal synchronization in OFDM based NB-IoT system.

Figure 5A:
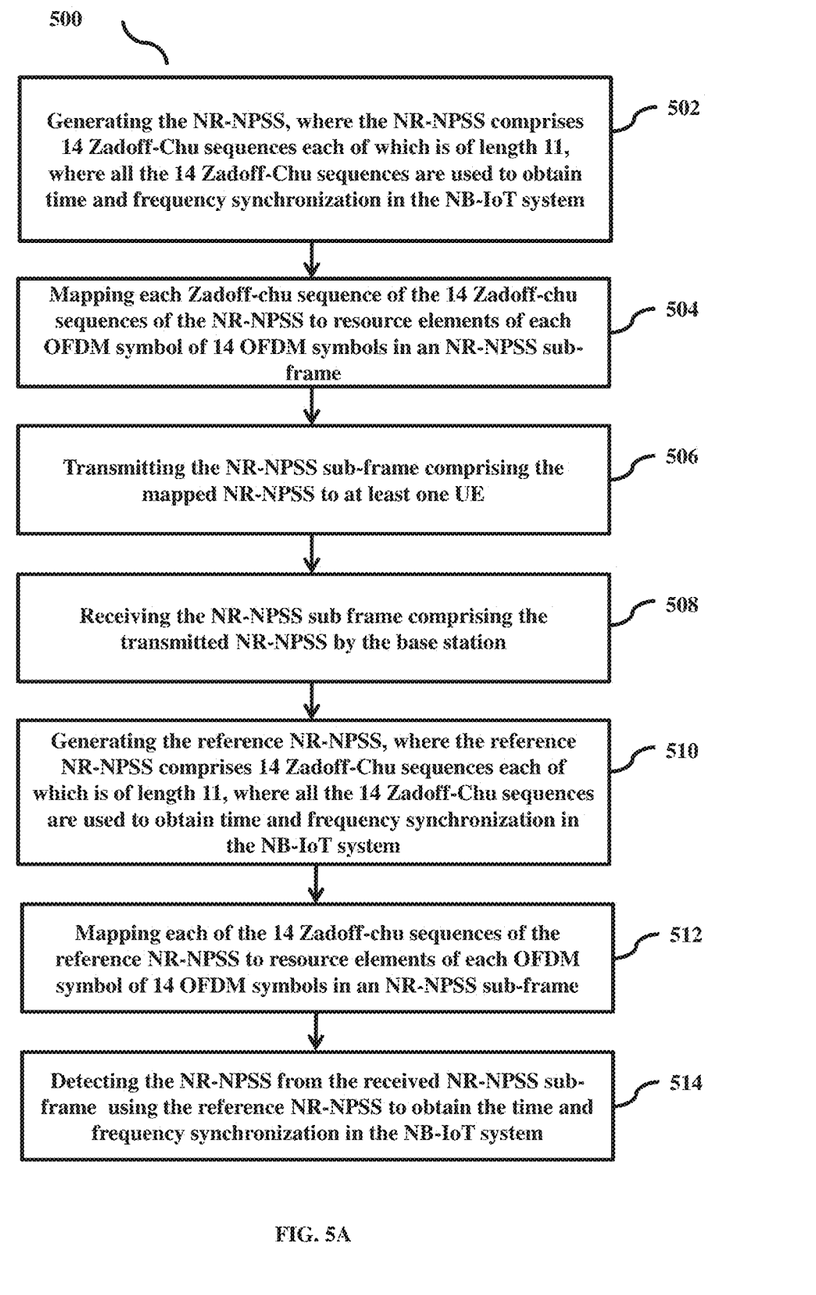
FIG. 5A-5B is a flow diagram illustrating a method for signal synchronization in OFDM based NB-IoT system, according to an embodiment as disclosed herein.
Figure 5B:
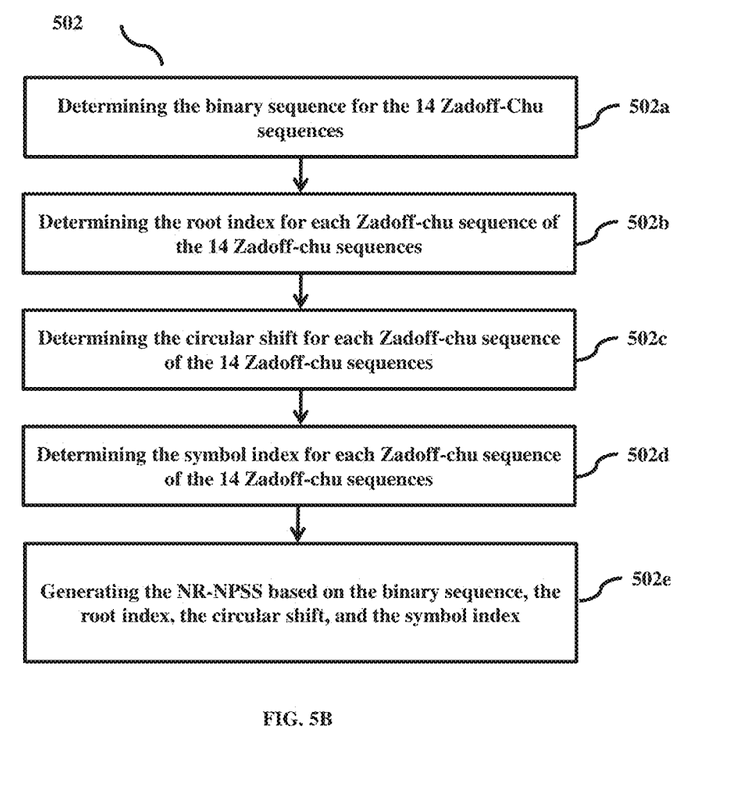

FIG. 5A-5B is a flow diagram (500) illustrating a method for signal synchronization in OFDM based NB-IoT system, according to an embodiment as disclosed herein. The operations (502-506) are performed by the base station (100) and operations (508-514) are performed by the UE (100).

Referring to the FIG. 5A: at 502, the method includes generating the NR-NPSS, where the NR-NPSS comprises 14 Zadoff-Chu sequences each of which is of length 11, where all the 14 Zadoff-Chu sequences are used to obtain time and frequency synchronization in the NB-IoT system. At 504, the method includes mapping each Zadoff-chu sequence of the 14 Zadoff-chu sequences of the NR-NPSS to resource elements of each OFDM symbol of 14 OFDM symbols in an NR-NPSS subframe. At 506, the method includes transmitting the NR-NPSS subframe comprising the mapped NR-NPSS to at least one UE (200).

At 508, the method includes receiving the NR-NPSS subframe comprising the transmitted NR-NPSS by the base station (100). At 510, the method includes generating the reference NR-NPSS, where the reference NR-NPSS comprises 14 Zadoff-Chu sequences each of which is of length 11, where all the 14 Zadoff-Chu sequences are used to obtain time and frequency synchronization in the NB-IoT system. At 512, the method includes mapping each of the 14 Zadoff-chu sequences of the reference NR-NPSS to resource elements of each OFDM symbol of 14 OFDM symbols in an NR-NPSS subframe. At 514, the method includes Detecting the NR-NPSS from the received NR-NPSS subframe using the reference NR-NPSS to obtain the time and frequency synchronization in the NB-IoT system.

Referring to the FIG. 5B: at 502a, the method includes determining the binary sequence for the 14 Zadoff-Chu sequences. At 502b, the method includes determining the root index for each Zadoff-chu sequence of the 14 Zadoff-chu sequences. At 502c, the method includes determining the circular shift for each Zadoff-chu sequence of the 14 Zadoff-chu sequences. At 502d, the method includes determining the symbol index for each Zadoff-chu sequence of the 14 Zadoff-chu sequences. At 502e, the method includes generating the NR-NPSS based on the binary sequence, the root index, the circular shift, and the symbol index.

Enhanced NPSS: In the current NB-IoT specifications, the NPSS subframe avoids the first three symbols to avoid collision with LTE PDCCH. This restriction brings inefficiency in resource utilization if this design is adopted as it is, in case of coexistence with NR. In an embodiment, a new NPSS design called as NR-NPSS is proposed for NB-IoT. NR-NPSS makes use of the resources effectively and improves the detection performance compared to the existing design.

NR-NPSS design: The NR-NPSS is a collection of 14 length-11 Zadoff-chu sequences. The NR-NPSS sequence $d_l(n)$ is generated using any one of the two methods described below.

In method-1:

$$d_l(n) = e^{-j\frac{\pi * u * modulo(n+\Delta,11)*(modulo(n+\Delta,11)+1)}{11}}; \quad (2)$$
$$n = 0, 1, 2, \ldots, 10$$

Where the Zadoff-chu sequence root index u is a positive integer, $\Delta$ is the circular shift and takes any one of the values 0, 1, 2, 3, 4, ..., 11, and symbol index l=0, 1, 2, ..., 13.

In method-2:

$$d'_l(k) = S(l) \cdot e^{-j\frac{\pi q k(k+1)}{11}}; k = 0, 1, 2, \ldots, 10. \quad (3)$$

$$d''_l(k) = S(l) \cdot e^{-j\frac{\pi u k(k+1)}{11}}; k = 0, 1, 2, \ldots, 10. \quad (4)$$

$$d_l(n) = \begin{cases} d'_l(modulo(n+\Delta, 11)), & \text{for } l = 0, 1, 2 \\ d''_l(n), & \text{for } l = 3, 4, \ldots, 13 \end{cases} \quad (5)$$

Where the q, and u are Zadoff-Chu sequence root indices. q is any positive integer greater than zero, for example, 5. u=5, n=0, 1, 2, ..., 10, symbol indices l=0, 1, 2, ..., 13, and S(l) takes any one of the 8 combinations as specified in Table. 2 illustrated in FIG. 8 is used. $\Delta$ is the circular shift applied to the first 3 Zadoff-chu sequences which are mapped into the symbols with indices l=0, 1, 2. $\Delta$ takes any one of the values 0, 1, 2, 3, 4, ..., 11.

In method-3:

$$d_l(n) = S(l)e^{-j\frac{\pi*u*modulo(n+\Delta,11)(modulo(n+\Delta,11)+1)}{11}};$$
$$n = 0, 1, 2, \ldots, 10$$
(6)

Where the Zadoff-chu sequence root index u is any positive integer, $\Delta$ is the circular shift and takes any one of the values 0, 1, 2, 3, 4, ..., 11, and symbol index l=0, 1, 2, ..., 13. S is a length 14 binary sequence of 1's, and −1's. The sequence S depends on B. B is any one of the integers in the range [0, 16383]. The binary representation of B is, $$B=b(13)b(12)b(11) \ldots b(2)b(1)b(0)_2$$
(7)

Where, b(·) takes the value of 0 or 1, b(0) is least significant bit and b(13) is the most significant bit. For a given B, $$S(l)=2*b(l)-1, l=0,1,2,\ldots,13$$
(8)

So, sequence S is any one of the 16384 combinations.

Figure 6:
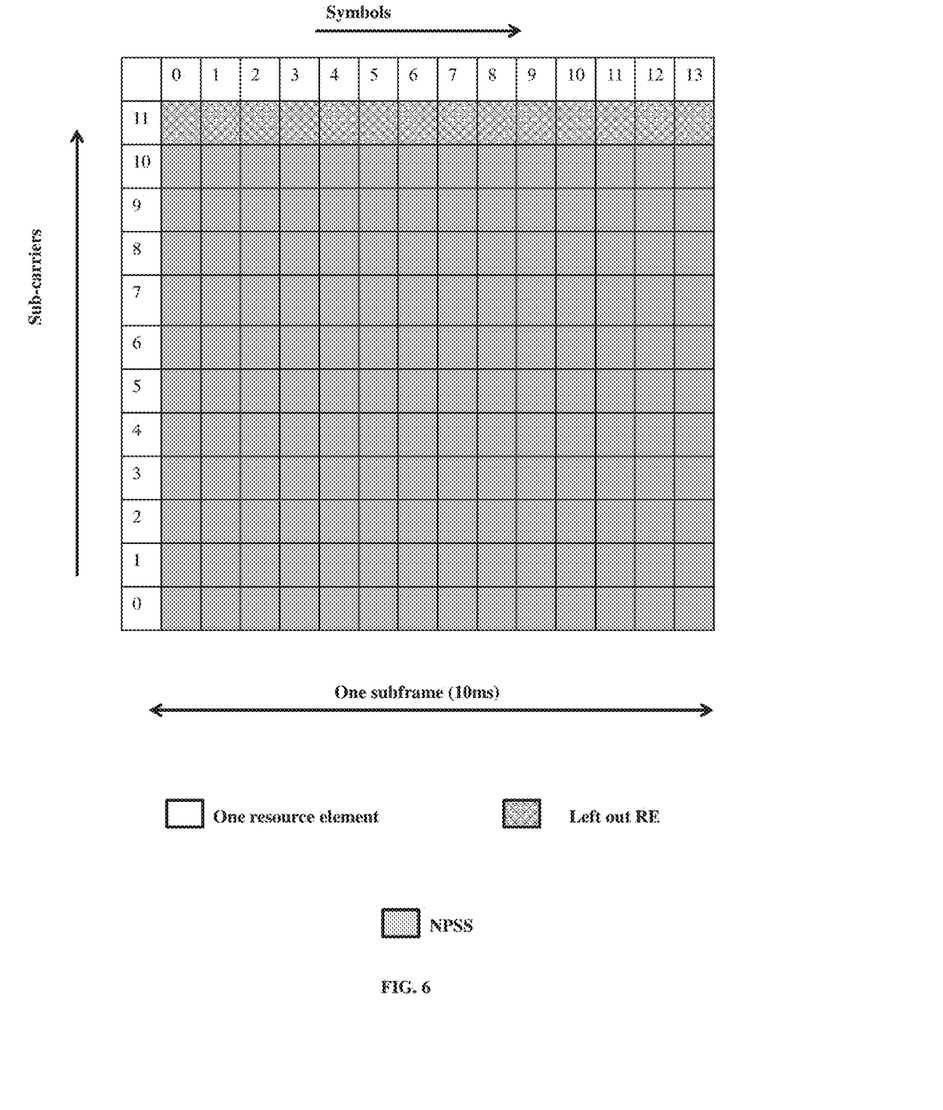
FIG. 6 illustrates an NR-NPSS mapping type-1 for signal synchronization in OFDM based NB-IoT system, according to an embodiment as disclosed herein.
Figure 7:
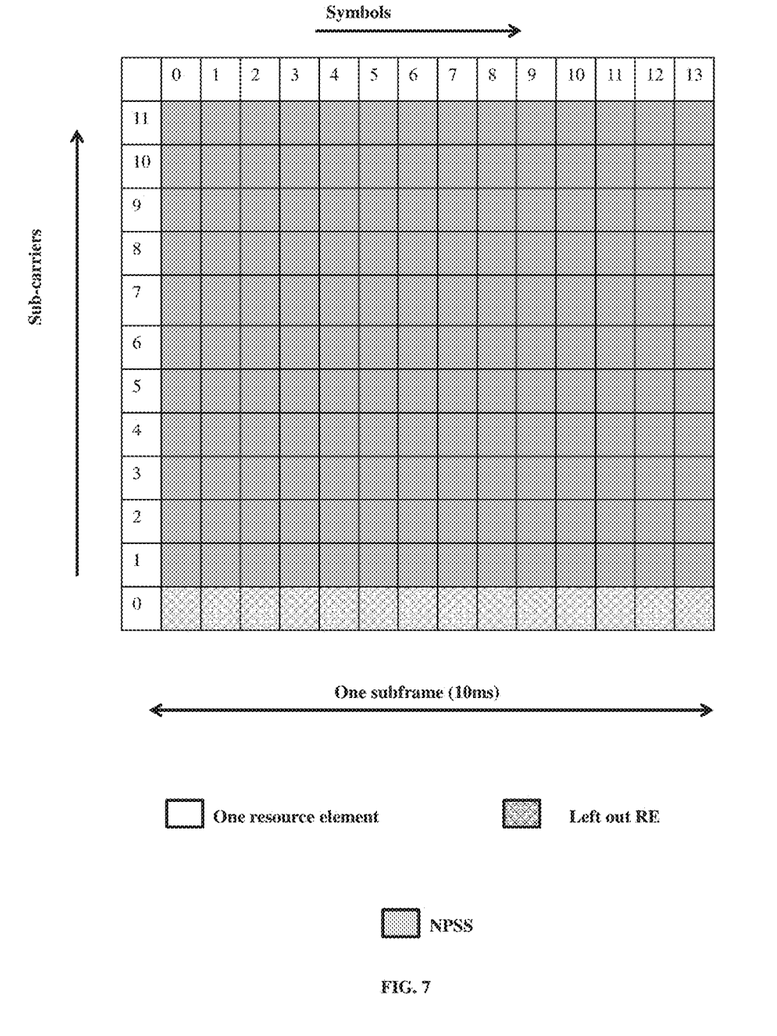
FIG. 7 illustrates an NR-NPSS mapping type-2 for signal synchronization in OFDM based NB-IoT system, according to an embodiment as disclosed herein.

NR-NPSS is mapped using any one of the two types described in FIG. 6 and FIG. 7.

FIG. 6 illustrates an NR-NPSS mapping type-1 for signal synchronization in OFDM based NB-IoT system, according to an embodiment as disclosed herein.

Each length-11 sequence is mapped on to 11 REs of each symbol, starting from RE index 0 to 10 in the NR-PSS subframe. One RE (index 11) in each symbol is left out. All the 14 symbols in the subframe are utilized.

FIG. 7 illustrates an NR-NPSS mapping type-2 for signal synchronization in OFDM based NB-IoT system, according to an embodiment as disclosed herein.

Each length-11 sequence is mapped on to 11 REs of each symbol, starting from RE index 1 to 11 in the NR-PSS subframe. One RE (index 0) in each symbol is left out. All the 14 symbols in the subframe are utilized.

Resource reservation: NR supports URLLC. URLLC traffic is sporadic in nature and highly latency-critical. The resource allocation is generally wideband for URLLC traffic to reduce the latency. When NB-IoT is co-existing with NR, one complete RB across time is dedicated to NB-IoT. In such a scenario, gNodeB or base station should be able to reserve resources in NB-IoT time-frequency resources in NR-NPSS subframe and can allocate them to latency-critical traffic, or traffic adaptation. A method of gNodeB or base station reserving one or more subsets of 1, 2, 3, ..., 14 symbols in NR-NPSS.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for signal synchronization in Orthogonal frequency-division multiplexing (OFDM) based Narrow Band-Internet of Thing (NB-IoT) system, comprising:
    generating, by a base station (100), a New Radio-Narrowband Primary Synchronization Signal (NR-NPSS), wherein the NR-NPSS comprises 14 Zadoff-Chu sequences each of which is of length 11, wherein all the 14 Zadoff-Chu sequences are used to obtain time and frequency synchronization in the NB-IoT system;
    mapping, by the base station (100), each Zadoff-chu sequence of the 14 Zadoff-chu sequences of the NR-NPSS to resource elements of each OFDM symbol of 14 OFDM symbols in an NR-NPSS subframe; and
    transmitting, by the base station (100), the NR-NPSS subframe comprising the mapped NR-NPSS to at least one User Equipment (UE) (200),
    wherein generating, by the base station (100), the NR-NPSS comprises:
        determining a binary sequence for the 14 Zadoff-Chu sequences;
        determining a root index for each Zadoff-chu sequence of the 14 Zadoff-chu sequences;
        determining a circular shift for each Zadoff-chu sequence of the 14 Zadoff-chu sequences;
        determining a symbol index for each Zadoff-chu sequence of the 14 Zadoff-chu sequences; and
        generating the NR-NPSS based on the binary sequence, the root index, the circular shift, and the symbol index.

2. The method as claimed in claim 1, wherein each Zadoff-chu sequence of the 14 Zadoff-chu sequences are obtained by at least one of changing a root index and cyclically shifting the Zadoff-chu sequences obtained with a specific root index.

3. The method as claimed in claim 1, wherein the root index is one of same and different for each Zadoff-chu sequence of the 14 Zadoff-chu sequences.

4. The method as claimed in claim 1, wherein the root index is 5 for all the 14 Zadoff-chu sequences.

5. The method as claimed in claim 1, wherein the circular shift is one of same and different for each Zadoff-chu sequence of the 14 Zadoff-chu sequences.

6. The method as claimed in claim 1, wherein the circular shift lies in a range of 0 to 11.

7. The method as claimed in claim 1, wherein a positive or negative sign of each Zadoff-chu sequence of the 14 Zadoff-Chu sequences depends on the binary sequence.

8. The method as claimed in claim 1, wherein the binary sequence depends on code cover ID (B) lying in a range of 0 to 16384.

9. The method as claimed in claim 1, wherein the root index is one of same and different for Zadoff-chu sequences 0 to 2 of the 14 Zadoff-Chu sequences.

10. The method as claimed in claim 1, wherein the root index is 5 for Zadoff-chu sequences 3 to 13 of the 14 Zadoff-Chu sequences.

11. The method as claimed in claim 1, wherein the circular shift is one of same and different for Zadoff-chu sequences 0 to 2 of the 14 Zadoff-Chu sequences.

12. The method as claimed in claim 1, wherein the circular shift lies in a range of 0 to 11 for Zadoff-chu sequences 0 to 2 of the 14 Zadoff-Chu sequences.

13. The method as claimed in claim 1, wherein the circular shift is 0 for Zadoff-chu sequences 3 to 13 of the 14 Zadoff-Chu sequences.

14. The method as claimed in claim 1, wherein the binary sequence is one of code cover sequence (S) of 8 code cover sequences.

15. The method as claimed in claim 1, wherein mapping each Zadoff-chu sequence of the 14 Zadoff-Chu sequences to the resource elements of each OFDM symbol of the 14 OFDM symbols in the NR-NPSS subframe comprising mapping 11 elements in each Zadoff-chu sequence of the 14 Zadoff-chu sequence to any of the 11 resource elements in each OFDM symbol of the 14 OFDM symbols in the NR-NPSS subframe.

16. The method as claimed in claim 15, wherein the 11 resource elements in each OFDM symbol of the 14 OFDM symbols in the NR-NPSS subframe is one of resource element index 0 to 10 leaving resource element index 11 in each of the OFDM symbol, and resource element index 1 to 11 leaving resource element index 0 in each of the OFDM symbol.

17. The method as claimed in claim 1, comprising:
receiving, by the at least one UE (200), the NR-NPSS subframe comprising the transmitted NR-NPSS by the base station (100);
generating, by the UE (200), a reference NR-NPSS, wherein the reference NR-NPSS comprises 14 Zadoff-Chu sequences each of which is of length 11, wherein all the 14 Zadoff-Chu sequences are used to obtain time and frequency synchronization in the NB-IoT system;
mapping, by the UE (200), each of the 14 Zadoff-chu sequences of the reference NR-NPSS to resource elements of each OFDM symbol of 14 OFDM symbols in an NR-NPSS subframe; and
detecting, by the UE (200), the NR-NPSS from the received NR-NPSS subframe using the reference NR-NPSS to obtain the time and frequency synchronization in the NB-IoT system.

18. A method for signal synchronization in Orthogonal frequency-division multiplexing (OFDM) based Narrow Band-Internet of Thing (NB-IoT) system, comprising:
receiving, by a User Equipment (UE) (200), a New Radio-Narrowband Primary Synchronization Signal (NR-NPSS) subframe comprising a NR-NPSS transmitted by a base station (BS) (100), wherein the NR-NPSS comprises a plurality of Zadoff-Chu sequences of length 11, wherein all the 14 Zadoff-Chu sequences are used to obtain time and frequency synchronization in the NB-IoT system;
generating, by the UE (200), a reference NR-NPSS, wherein the reference NR-NPSS comprises 14 Zadoff-Chu sequences each of which is of length 11, wherein all the 14 Zadoff-Chu sequences are used to obtain time and frequency synchronization in the NB-IoT system;
mapping, by the UE (200), each of the 14 Zadoff-chu sequences of the reference NR-NPSS to resource elements of each OFDM symbol of 14 OFDM symbols in an NR-NPSS subframe; and
detecting, by the UE (200), the NR-NPSS from the received NR-NPSS subframe using the reference NR-NPSS to obtain the time and frequency synchronization in the NB-IoT system,
wherein generating the reference NR-NPSS comprises:
determining a binary sequence for the 14 Zadoff-Chu sequences;
determining a root index for each Zadoff-chu sequence of the 14 Zadoff-chu sequences;
determining a circular shift for each Zadoff-chu sequence of the 14 Zadoff-chu sequences;
determining a symbol index for each Zadoff-chu sequence of the 14 Zadoff-chu sequences; and
generating the reference NR-NPSS based on the binary sequence, the root index, the circular shift, and the symbol index.

19. The method as claimed in claim 18, wherein the root index is one of same and different for each Zadoff-chu sequence of the 14 Zadoff-chu sequences.

20. The method as claimed in claim 18, wherein the root index is 5 for all the Zadoff-chu sequences.

21. The method as claimed in claim 18, wherein the circular shift is one of same and different for each of the Zadoff-chu sequence of the 14 Zadoff-chu sequences.

22. The method as claimed in claim 18, wherein the circular shift lies in a range of 0 to 11.

23. The method as claimed in claim 18, wherein a positive or negative sign of each of the Zadoff-Chu sequence of the 14 Zadoff-Chu sequences depends on the binary sequence.

24. The method as claimed in claim 18, wherein the binary sequence depends on code cover ID (B) lying in a range of 0 to 16384.

25. The method as claimed in claim 18, wherein the root index is one of same and different for Zadoff-chu sequences 0 to 2 of the 14 Zadoff-Chu sequences.

26. The method as claimed in claim 18, wherein the root index is 5 for Zadoff-chu sequences 3 to 13 of the 14 Zadoff-Chu sequences.

27. The method as claimed in claim 18, wherein the circular shift is one of same and different for Zadoff-chu sequences 0 to 2 of the 14 Zadoff-Chu sequences.

28. The method as claimed in claim 18, wherein the circular shift lies in a range of 0 to 11 for Zadoff-chu sequences 0 to 2 of the 14 Zadoff-Chu sequences.

29. The method as claimed in claim 18, wherein the circular shift is 0 for Zadoff-chu sequences 3 to 13 of the 14 Zadoff-Chu sequences.

30. The method as claimed in claim 18, wherein the binary sequence is one of the code cover sequence (S) of 8 code cover sequences.

31. The method as claimed in claim 18, wherein mapping each of the Zadoff-Chu sequence of the 14 Zadoff-Chu sequences to the resource elements of each OFDM symbol of the 14 OFDM symbols in the NR-NPSS subframe comprising mapping 11 elements in each of the Zadoff-chu sequence of the 14 Zadoff-chu sequences to any of the 11 resource elements in each OFDM symbol of the 14 OFDM symbols in the NR-NPSS subframe.

32. The method as claimed in claim 31, wherein the 11 resource elements in each OFDM symbol of the 14 OFDM symbols in the NR-NPSS subframe is one of resource element index 0 to 10 leaving resource element index 11 in each of the OFDM symbol, and resource element index 1 to 11 leaving resource element index 0 in each of the OFDM symbol.

33. A base station (100) for signal synchronization in a through a Narrow Band-Internet of Thing (NB-IoT) system, comprising:
a memory (110);
a processor (120); and
a New Radio-Narrowband Primary Synchronization Signal (NR-NPSS) circuit (140), coupled to the memory and the processor, configured to:
generate a New Radio-Narrowband Primary Synchronization Signal (NR-NPSS), wherein the NR-NPSS comprises 14 Zadoff-Chu sequences each of which is of length 11, wherein all the 14 Zadoff-Chu sequences are used to obtain time and frequency synchronization in the NB-IoT system;

map each Zadoff-chu sequence of the 14 Zadoff-chu sequences of the NR-NPSS to resource elements of each OFDM symbol of 14 OFDM symbols in an NR-NPSS subframe; and transmit the NR-NPSS subframe comprising the mapped NR-NPSS to at least one User Equipment (UE) (200), wherein generating, by the base station (100), the NR-NPSS comprises:

determining a binary sequence for the 14 Zadoff-Chu sequences;

determining a root index for each Zadoff-chu sequence of the 14 Zadoff-chu sequences;

determining a circular shift for each Zadoff-chu sequence of the 14 Zadoff-chu sequences;

determining a symbol index for each Zadoff-chu sequence of the 14 Zadoff-chu sequences;

generating the NR-NPSS based on the binary sequence, the root index, the circular shift, and the symbol index.

34. The base station (100) as claimed in claim 33, wherein each Zadoff-chu sequence of the 14 Zadoff-chu sequences are obtained by at least one of changing a root index and cyclically shifting the Zadoff-chu sequences obtained with a specific root index.

35. The base station (100) as claimed in claim 33, wherein the root index is one of same and different for each Zadoff-chu sequence of the 14 Zadoff-chu sequences.

36. The base station (100) as claimed in claim 33, wherein the root index is 5 for all the 14 Zadoff-chu sequences.

37. The base station (100) as claimed in claim 33, wherein the circular shift is one of same and different for each Zadoff-chu sequence of the 14 Zadoff-chu sequences.

38. The base station (100) as claimed in claim 33, wherein the circular shift lies in a range of 0 to 11.

39. The base station (100) as claimed in claim 33, wherein a positive or negative sign of each Zadoff-chu sequence of the 14 Zadoff-Chu sequences depends on the binary sequence.

40. The base station (100) as claimed in claim 33, wherein the binary sequence depends on code cover ID (B) lying in a range of 0 to 16384.

41. The base station (100) as claimed in claim 33, wherein the root index is one of same and different for Zadoff-chu sequences 0 to 2 of the 14 Zadoff-Chu sequences.

42. The base station (100) as claimed in claim 33, wherein the root index is 5 for Zadoff-chu sequences 3 to 13 of the 14 Zadoff-Chu sequences.

43. The base station (100) as claimed in claim 33, wherein the circular shift is one of same and different for Zadoff-chu sequences 0 to 2 of the 14 Zadoff-Chu sequences.

44. The base station (100) as claimed in claim 33, wherein the circular shift lies in a range of 0 to 11 for Zadoff-chu sequences 0 to 2 of the 14 Zadoff-Chu sequences.

45. The base station (100) as claimed in claim 33, wherein the circular shift is 0 for Zadoff-chu sequences 3 to 13 of the 14 Zadoff-Chu sequences.

46. The base station (100) as claimed in claim 33, wherein the binary sequence is one of code cover sequence (S) of 8 code cover sequences.

47. The base station (100) as claimed in claim 33, wherein mapping each Zadoff-chu sequence of the 14 Zadoff-Chu sequences to the resource elements of each OFDM symbol of the 14 OFDM symbols in the NR-NPSS subframe comprising mapping 11 elements in each Zadoff-chu sequence of the 14 Zadoff-chu sequence to any of the 11 resource elements in each OFDM symbol of the 14 OFDM symbols in the NR-NPSS subframe.

48. The base station (100) as claimed in claim 47, wherein the 11 resource elements in each OFDM symbol of the 14 OFDM symbols in the NR-NPSS subframe is one of resource element index 0 to 10 leaving resource element index 11 in each of the OFDM symbol, and resource element index 1 to 11 leaving resource element index 0 in each of the OFDM symbol.

49. A User Equipment (UE) (200) for signal synchronization in a through a Narrow Band-Internet of Thing (NB-IoT) system, comprising:

a memory (210);

a processor (220); and a New Radio-Narrowband Primary Synchronization Signal (NR-NPSS) circuit (240), coupled to the memory and the processor, configured to:

receive a New Radio-Narrowband Primary Synchronization Signal (NR-NPSS) subframe comprising a NR-NPSS transmitted by a base station (100) (BS), wherein the NR-NPSS comprises a plurality of Zadoff-Chu sequences of length 11, wherein all the 14 Zadoff-Chu sequences are used to obtain time and frequency synchronization in the NB-IoT system;

generate a reference NR-NPSS, wherein the reference NR-NPSS comprises 14 Zadoff-Chu sequences each of which is of length 11, wherein all the 14 Zadoff-Chu sequences are used to obtain time and frequency synchronization in the NB-IoT system;

map each of the 14 Zadoff-chu sequences of the reference NR-NPSS to resource elements of each OFDM symbol of 14 OFDM symbols in an NR-NPSS subframe; and detect the NR-NPSS from the received NR-NPSS subframe using the reference NR-NPSS to obtain the time and frequency synchronization in the NB-IoT system, wherein generating the reference NR-NPSS comprises:

determining a binary sequence for the 14 Zadoff-Chu sequences;

determining a root index for each Zadoff-chu sequence of the 14 Zadoff-chu sequences;

determining a circular shift for each Zadoff-chu sequence of the 14 Zadoff-chu sequences;

determining a symbol index for each Zadoff-chu sequence of the 14 Zadoff-chu sequences; and generating the reference NR-NPSS based on the binary sequence, the root index, the circular shift, and the symbol index.

50. The UE (200) as claimed in claim 49, wherein the root index is one of same and different for each Zadoff-chu sequence of the 14 Zadoff-chu sequences.

51. The UE (200) as claimed in claim 49, wherein the root index is 5 for all the Zadoff-chu sequences.

52. The UE (200) as claimed in claim 49, wherein the circular shift is one of same and different for each of the Zadoff-chu sequence of the 14 Zadoff-chu sequences.

53. The UE (200) as claimed in claim 49, wherein the circular shift lies in a range of 0 to 11.

54. The UE (200) as claimed in claim 49, wherein a positive or negative sign of each of the Zadoff-Chu sequence of the 14 Zadoff-Chu sequences depends on the binary sequence.

55. The UE (200) as claimed in claim 49, wherein the binary sequence depends on code cover ID (B) lying in a range of 0 to 16384.

56. The UE (200) as claimed in claim 49, wherein the root index is one of same and different for Zadoff-chu sequences 0 to 2 of the 14 Zadoff-Chu sequences.

57. The UE (200) as claimed in claim 49, wherein the root index is 5 for Zadoff-chu sequences 3 to 13 of the 14 Zadoff-Chu sequences.

58. The UE (200) as claimed in claim 49, wherein the circular shift is one of same and different for Zadoff-chu sequences 0 to 2 of the 14 Zadoff-Chu sequences.

59. The UE (200) as claimed in claim 49, wherein the circular shift lies in a range of 0 to 11 for Zadoff-chu sequences 0 to 2 of the 14 Zadoff-Chu sequences.

60. The UE (200) as claimed in claim 49, wherein the circular shift is 0 for Zadoff-chu sequences 3 to 13 of the 14 Zadoff-Chu sequences.

61. The UE (200) as claimed in claim 49, wherein the binary sequence is one of code cover sequence (S) of 8 code cover sequences.

62. The UE (200) as claimed in the claim 49, wherein mapping each of the Zadoff-Chu sequence of the 14 Zadoff-Chu sequences to the resource elements of each OFDM symbol of the 14 OFDM symbols in the NR-NPSS subframe comprising mapping 11 elements in each of the Zadoff-chu sequence of the 14 Zadoff-chu sequences to any of the 11 resource elements in each OFDM symbol of the 14 OFDM symbols in the NR-NPSS subframe.

63. The UE (200) as claimed in claim 62, wherein the 11 resource elements in each OFDM symbol of the 14 OFDM symbols in the NR-NPSS subframe is one of resource element index 0 to 10 leaving resource element index 11 in each of the OFDM symbol, and resource element index 1 to 11 leaving resource element index 0 in each of the OFDM symbol.

* * * * *